United States Patent [19]

Lamarre

[11] 3,941,991

[45] Mar. 2, 1976

[54] METHOD AND APPARATUS FOR RECORDING AND/OR INDICATING IN QUANTIFIED FORM A FUNCTION OF TWO VARIABLES

[75] Inventor: Jean-Michel Lamarre, Fleury-Les-Aubrais, France

[73] Assignee: Agence Nationale de Valorisation de la Recherche (ANVAR), France

[22] Filed: Oct. 18, 1973

[21] Appl. No.: 407,510

[30] Foreign Application Priority Data

Oct. 18, 1972 France............................ 72.36821

[52] U.S. Cl. ............. 235/197; 235/198; 340/324 A
[51] Int. Cl.[2] ......................................... G06G 7/26
[58] Field of Search.............. 235/197, 198, 150.53; 340/324 A, 324 AD, 324 DA; 324/77; 315/383, 386

[56] References Cited
UNITED STATES PATENTS

| | | | |
|---|---|---|---|
| 1,977,999 | 10/1934 | Prinz................................... | 235/198 |
| 2,412,467 | 12/1946 | Morton............................... | 235/198 |
| 2,714,704 | 8/1955 | Morrison........................... | 328/14 X |
| 2,859,916 | 11/1958 | Doll..................................... | 235/198 |
| 2,996,581 | 8/1961 | Lord et al........................... | 328/14 X |
| 3,110,802 | 11/1963 | Ingham et al.................. | 235/150.53 |
| 3,248,699 | 4/1966 | Essinger et al.................... | 328/14 X |
| 3,426,210 | 2/1969 | Agin................................... | 328/14 X |
| 3,458,721 | 7/1969 | Maynard........................... | 328/14 X |
| 3,459,932 | 8/1969 | Huey et al. ........................ | 235/197 |
| 3,484,777 | 12/1969 | Delagrange .................. | 235/197 UX |
| 3,544,906 | 12/1970 | Dulaney et al...................... | 328/14 |
| 3,668,380 | 6/1972 | Claxton.............................. | 235/197 |
| 3,745,407 | 7/1973 | Day..................................... | 315/30 |

Primary Examiner—Joseph F. Ruggiero
Attorney, Agent, or Firm—Craig & Antonelli

[57] ABSTRACT

Method and apparatus for recording and/or indicating a function of two variables, characterized in that a signal having a value Z which is a function of two variables X and Y is quantified and is then represented in quantified form. The representation in quantified form is effected by projecting a luminous spot on a display area at the point of coordinates (X, Y) wherein the luminosity of the spot represents the quantified form of the value Z.

27 Claims, 6 Drawing Figures

METHOD AND APPARATUS FOR RECORDING AND/OR INDICATING IN QUANTIFIED FORM A FUNCTION OF TWO VARIABLES

The present invention relates to a method and apparatus for measuring and/or recording and/or indication, in quantified form, a function of two variables.

In the present state of the art it is known, for example, in television systems, to modulate the luminosity or intensity of the spot on a cathode tube. However, this is an analog modulation and is not representative of a measurement. Also, in the present state of the art it is known, in the utilization of oscilloscopes, to vary the luminosity of the spot by periodic extinctions or blanking as an estimate of the duration of a brief signal. However, this modulation is an all or nothing modulation and has no other possibility.

Accordingly, it is an object of the present invention to solve the problem of obtaining on a recording or an indication in two dimensions representing two independent variables X and Y, a representation - allowing for measurement — of a value Z which is a function of the two variables X and Y. This is in some way the problem of the so-called staff map wherein the altitude Z is represented by curves having an equidistant level. However, in accordance with the present invention the problem is initiated and solved in an electronic manner, that is, automatically and instantly by starting from electric signals.

In accordance with the method of the present invention, the signal representing the aforementioned value Z is quantified, then it is represented or displayed in quantified form by the luminosity of a luminous spot projected at the point of coordinates (X, Y). For example, but not necessarily, this spot may be that of a cathode tube, for instance also equipped with a photographic or cinematographic apparatus.

In accordance with an embodiment of an apparatus utilizing or applying the method of the present invention, the signal representing the value Z is compared, after calibration, to a plurality of levels by a plurality of comparators. The output signals of these comparators are then summed with a specific weighting of the signals to provide an output signal.

According to another embodiment of an apparatus for applying the method of the present invention, the signal representing the value Z is processed by two groups of cascaded comparators-adders, followed by a nonlinear amplifier furnishing an output signal.

In accordance with the two above-mentioned embodiments, the signal representing the value Z, which signal may be an analog signal, is translated without any delay by an output signal which is quantified and which is an analog signal. However, the present invention also provides that the quantification can be made by two converters in cascade, and specifically, a first analog to digital converter of which only the binary numbers of the greatest weight are applied to a second digital to analog converter.

In accordance with the two above-mentioned embodiments, it is possible to add to the output signal either one or several additional signals. For example, for the purpose of improving the recording and indication, the additional signal may be the differential of the output signal; or also a brief pulse type signal at each variation of the quantification. Further, this additional signal may, for example, be the signal representing Z itself.

These and other objects, features and advantages of the present invention will become more apparent from the following description when taken in connection with the accompanying drawing which shows, for purposes of illustration only, several embodiments in accordance with the present invention, and wherein.

Figure 1:
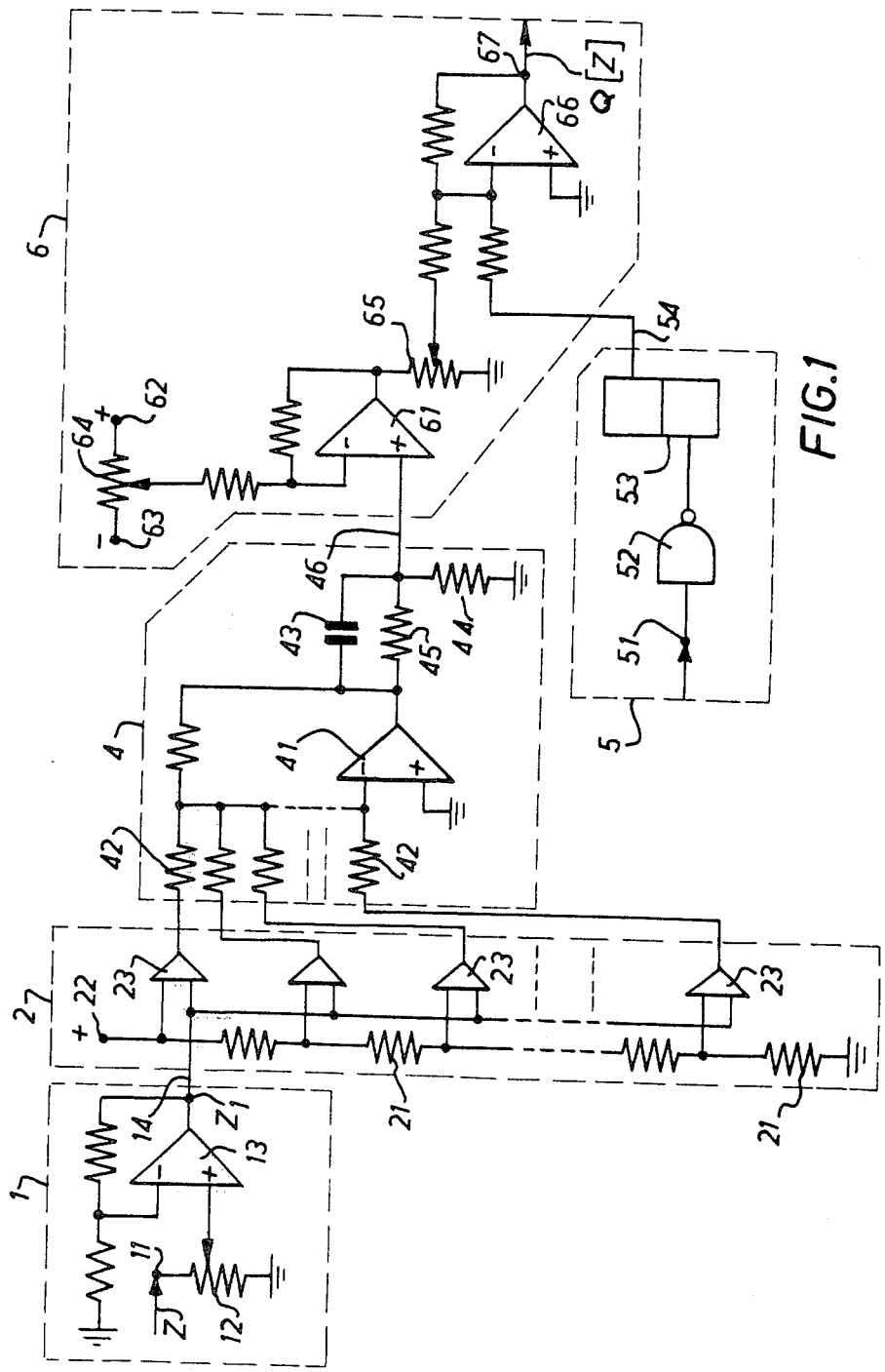
FIG. 1 is a block diagram of an apparatus according to an embodiment of the present invention.

Referring now to FIG. 1, there is shown an embodiment of the apparatus of the present invention in block diagram form including an input device 1, a quantification device 2, an adder-differentiator device 4, a calibration device 5, and an output device 6. The input device 1 receives on its input 11 the signal Z and then calibrates the signal by means of an attenuator 12, consisting for example of a ten-turn potentiometer, followed by an operational amplifier 13 providing a calibrated signal $Z_1$ at the output thereof having a value for example between 0 and 5 volts for application to the quantification device 2. In the quantification device 2, the calibrated signal $Z_1$ is compared to a plurality of $n$ levels, for example 16 levels, by a chain of $n$ resistors 21 supplied or energized by a reference voltage applied to the terminal 22 providing the set level signals to the $n$ comparators 23, only several of which have been illustrated in the drawing for purposes of clarity. The comparators, may be for example integrated circuits of the type 710. In the device 4, the $n$ outputs of the comparators of the quantification device 2 are summed by an amplifier 41, of the type 709, for example, with each of these outputs being weighted differently by means of resistors 42 so as to compensate for the nonlinearity of the entire response curve of for example the eye or oscilloscope-photo. The sum signal obtained is differentiated by a circuit having a condenser 43 and resistor 44 with the resistor 45 furnishing on the output 46 the sum signal and its differential as described hereinafter. A calibration device 5 is utilized to permit an external signal to be applied to the apparatus via its input 51 which external signal is shaped by means of an AND circuit 52 and a monostable device 53 providing an output signal at 54 to the output device 6. The output device 6 sets or adjusts the zero point of the signal received at 46 by means of an operational amplifier 61 regulated by means of a potentiometer 64 having two opposed reference voltages applied to the terminals 62 and 63 thereof. The signal is then calibrated in amplitude by a potentiometer 65 and summed with the signal on the lead 54 by an operational amplifier 66 which provides an output of the quantified signal Q [Z] at 67.

Figure 2:
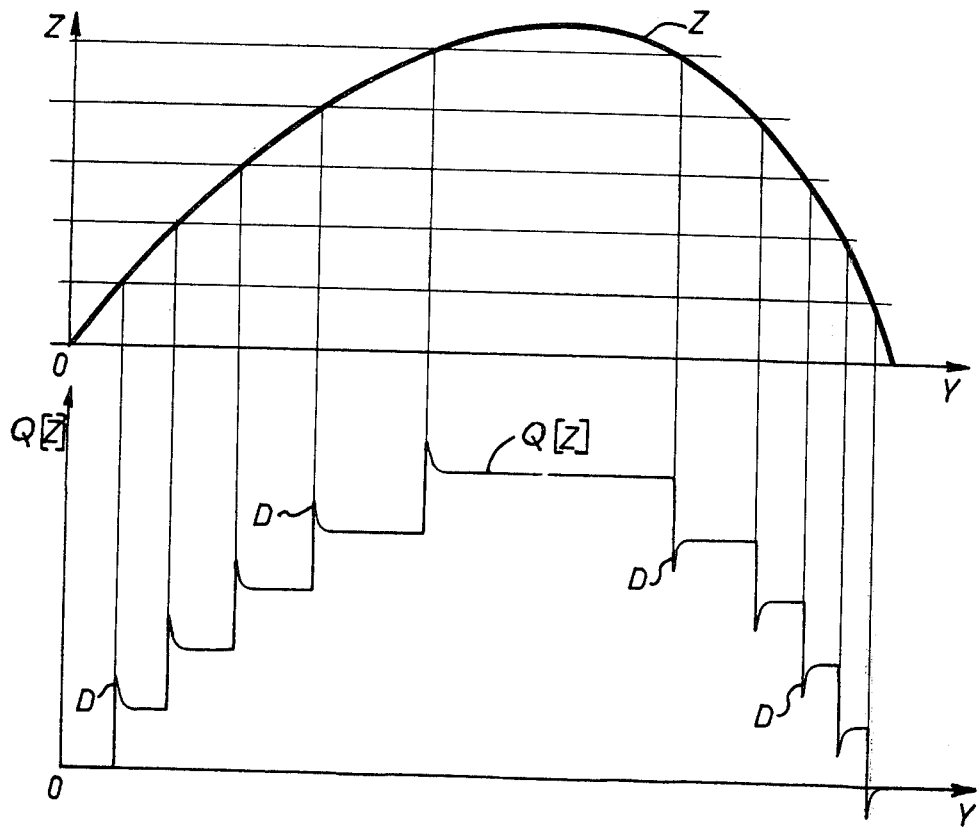
FIG. 2 illustrates explanatory curves of the signals of the apparatus of FIG. 1.

FIG. 2 illustrates the curves of the signal Z and the quantified signal Q [Z] wherein the output signal Q [Z] of the above described apparatus of FIG. 1 is applied to an oscilloscope with a television type scan, or a frame scanning in X and a line scanning in Y. The graph at the top of FIG. 2 represents during a line X = Xo the variation of the signal Z (the ordinate) as function of the variable Y (the abscissa). As shown, the signal Z for example starts from zero, passes over five levels (from among the $n$ levels) and falls back to zero. At each passage of a level by Z, the quantified signal Q [Z] changes level with an initial overswing D (lower graph of FIG. 2) which is assured by the aforementioned differentiation (43–44 of the device 4), and which is in the same direction as the change of level, in other words, positive when Z increases, and negative when Z decreases. These overswings D offer several advantages in that the changes in level of the quantified signal Q [Z] are better marked and placed in evidence; the polarity of the overswing D indicates without ambiguity the direction of the change in level of Q [Z]; because of the eye response or the response of a photographic apparatus, the overswings D increase the contrast apparent between two neighboring levels and thus increase the dynamic ratio of the image. For example, an image may be obtained utilizing a Federal Scientific UA-6B type analyzer connected to the input of the FIG. 1 apparatus and an oscilloscope connected to the output of such apparatus wherein the cathode screen is modulated by the output signal Q [Z] of the apparatus.

Figure 3:
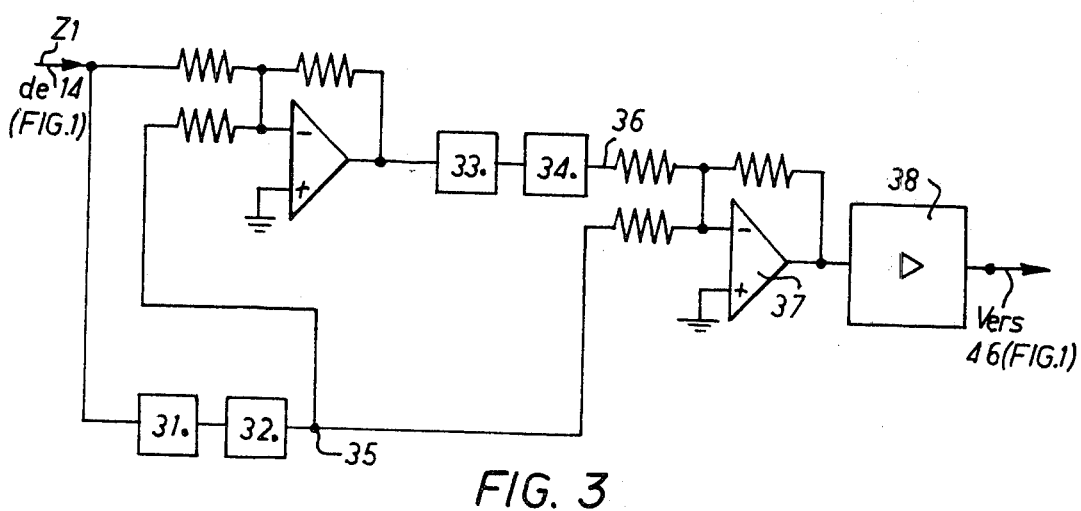
FIG. 3 is a block diagram of an apparatus according to another embodiment of the present invention.

Another embodiment of the apparatus in accordance with the present invention is illustrated in block diagram form in FIG. 3 which utilizes a portion of the circuitry of FIG. 1. In the FIG. 3 embodiment, the output 14 of the input device 1 of FIG. 1 is applied to the illustrated apparatus and the output of such apparatus is applied to the input 46 of the output device 6 of FIG. 1, which devices 1 and 6 are not again described. The single unit of the quantification device 2 and of the adder-differentiator device 4 of FIG. 1 are replaced in this embodiment by two such assemblies or units, or a unit or assembly comprising a quantification device 31 and a summer-differentiator device 32, and a unit or assembly comprising a quantification device 33 and a summer-differentiator device 34 which are identical to those already described hereinabove, except that resistors 42 having equal values are utilized to equivalent outputs. The signal at the output 35 of the assembly 31–32 is applied to an input of the assembly 31–32 via an operational amplifier which serves for restoring the signal into the range of the assembly 33–34 since the two assemblies operate in different ranges. The output 35 of the assembly 31–32 and the output 36 of the assembly 33–34 are summed by an operational amplifier 37, followed by a nonlinear amplifier 38 which compensates for the nonlinearity of the remainder of the system components.

Figure 4:
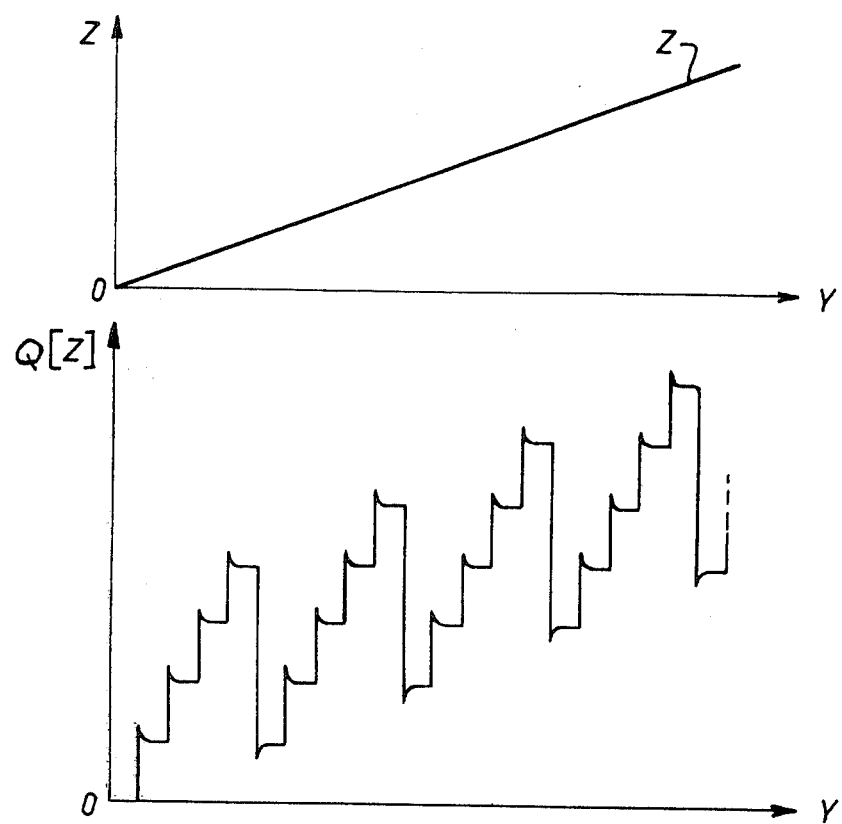
FIG. 4 illustrates explanatory curves of the signals of the apparatus of FIG. 3.

FIG. 4 illustrates curves which are analogous to the curves of FIG. 2 indicating the response of the apparatus according to the FIG. 3 embodiment (the assembly 33–34 containing four comparators) to a signal Z in the form of a rising slope. It is clear that this apparatus provides a quantified signal which increases, for the same dynamic ratio of the support, the number of levels represented, and without ambiguity wherein the signal falls back at each cycle to a different starting level.

Figure 5:
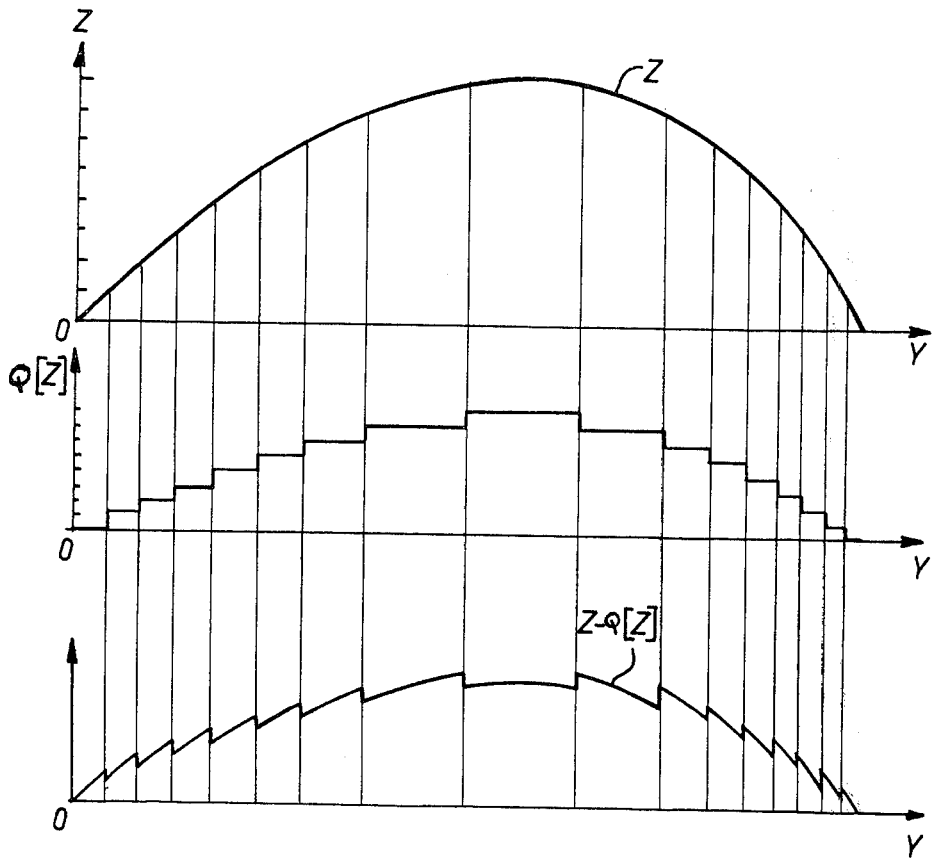
FIG. 5 illustrates curves in accordance with another embodiment of the present invention.

FIG. 5 illustrates curves in accordance with the present invention wherein there is added to the quantified signal Q [Z] an additional signal which is here the signal Z itself so as to provide an output signal which is the algebraic addition Z-Q [Z].

Figure 6:
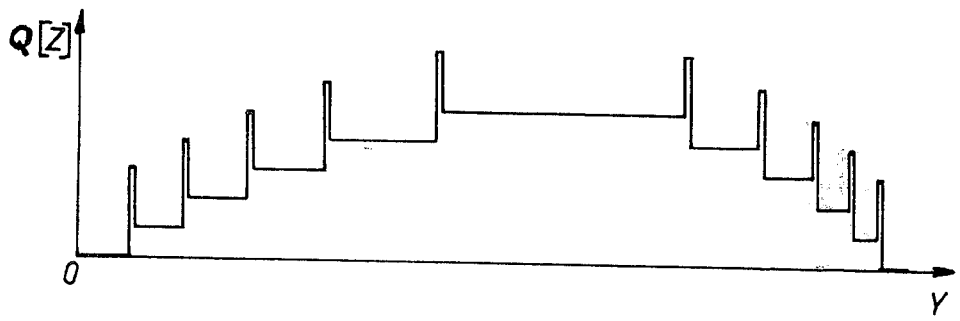
FIG. 6 illustrates a curve in accordance with still another embodiment of the present invention.

FIG. 6 illustrates another curve in accordance with another embodiment of the present invention wherein instead of adding the differential to the signal there is added a pulse type signal, obtained for example in a manner known in the art by two monostable devices triggered by the respectively rising and descending edges of the quantified signal Q [Z].

The method and apparatus of the present invention may be utilized in different types of known systems, such as signal analyzers including spectrum analyzers, correlating means, averaging means, multi-channel selectors, statistical analyzers, ambiguimeters, etc.; measuring apparatus including all apparatus with scanning, infrared cameras, sonars, radars, etc., and transmission systems including telephone lines, telegraph lines, radios, satellites, television, etc. Further, the method and the apparatus according to the present invention may utilize different types of known systems, such as oscilloscopes with modulation of the cathode screen in visual observation, in photographic recording, in cinematographic recording (with continuous passage of the film; memory oscilloscopes allowing for the representation of half-tones; and with outputs on recorder, telephotographs on thermosensitive paper or the like.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What I claim is:

1. A method for at least indicating a function Z of two variables X and Y comprising the steps of quantifying the value of the function Z and displaying the quantified form of the value of the function Z by projecting a luminous spot on a display area at the point of coordinates (X, Y) and providing a luminosity for the spot representative of the quantified form of the value of the function Z.

2. The method according to claim 1, further comprising the step of generating the function Z.

3. Apparatus for at least indicating a function Z of two variables X and Y comprising quantifying means for receiving a signal representative of the function Z and providing a quantified function Z output signal, and means for displaying the quantified function output signal including means for projecting a luminous spot on a display area at the point of coordinates (X, Y) and providing a luminosity representative of the quantified function signal.

4. Apparatus according to claim 3, wherein said quantifying means includes means for calibrating the function Z signal and providing a calibrated Z signal, comparator means for comparing the calibrated Z signal with a plurality of reference levels and providing output signals indicative of the comparisons, means for providing a predetermined weighting for each of the output signals of said comparator means, and means for summing the weighted output signals to provide the quantified function output signal.

5. Apparatus according to claim 4, further comprising means for algebraically adding at least one additional signal to the quantified function signal to provide a resultant quantified signal which is displayed.

6. Apparatus according to claim 5, wherein said at least one additional signal is a differential of said quantified function signal.

7. Apparatus according to claim 3, wherein said quantifying means includes means for calibrating the function Z signal and providing a calibrated Z signal, two assemblies of comparator-summing means arranged in cascade for processing the calibrated Z signal, and nonlinear amplifier means receiving the output of said cascaded comparator-summing means and providing the quantified function output signal.

8. Apparatus according to claim 7, further comprising means for algebraically adding at least one additional signal to the quantified function signal to provide a resultant quantified signal which is displayed.

9. Apparatus according to claim 8, wherein said at least one additional signal is a differential of said quantified function signal.

10. Apparatus according to claim 3, wherein the function Z signal is an analog signal and said quantifying means includes analog-digital convertor means and digital-analog convertor means, said analog-digital convertor means for converting the analog Z signal into a digital signal and applying only the binary digits with the highest weighting to said digital-analog convertor means, said digital-analog convertor means providing the quantified function output signal.

11. Apparatus according to claim 10, further comprising means for algebraically adding at least one additional signal to the quantified function signal to provide a resultant quantified signal which is displayed.

12. Apparatus according to claim 11, wherein said at least one additional signal is a differential of said quantified function signal.

13. Apparatus according to claim 4, wherein said quantifying means includes input means, quantification means, summer-differentiator means, additional signal calibrator means, and output means, said input means including said calibrating means and comprising an attenuator having a potentiometer and an operational amplifier, connected to said attenuator for providing the calibrated Z signal, said quantification means including said comparator means and having $n$ plurality of comparators receiving the calibrated Z signal, reference level setting means including $n$ plurality of resistors providing $n$ reference levels to said $n$ comparators, said summer-differentiator means including said weighting means having an individual resistor providing each output signal of said $n$ comparators with a predetermined weighting, said summing means summing the weighted signals to provide the quantified function signal R-C circuit differentiating means differentiating the quantified function signal and adding the differential to the quantified function signal for application to said output means additional signal calibrator means for receiving an additional signal and shaping and calibrating the additional signal and for applying the calibrated additional signal to said output means, said output means for summing the output signals of said summer-differentiator means and said additional signal calibrator means and providing an output signal for display.

14. Apparatus according to claim 13, wherein said output means includes an operational amplifier for receiving the output signal of said summer-differentiator means and means for setting the output signal to zero including a potentiometer connected to said operational amplifier and connected between two reference voltages, and a potentiometer connected at the output of said operational amplifier for providing a calibrated signal to said summing means fo said output means.

15. Apparatus according to claim 14, wherein said additional signal calibrator means receives one of a signal representative of the value of the function Z, and an external signal generated by an external device.

16. Apparatus according to claim 7, comprising input means, said two cascaded assemblies of comparator-summing means each including quantification means and summer-differentiator means, summing means, said nonlinear amplifier means, and output means, said input means including said calibrating means and comprising a potentiometer-attenuator means connected to an operational amplifier providing the calibrated Z signal, each of said quantification means comprising $p$ plurality of comparators for receiving the calibrated Z signal and reference level setting means including $p$ plurality of resistors providing $p$ reference levels for said $p$ comparators, each summer-differentiator means including means for summing the outputs of said $p$ comparators of its respective group by $p$ resistors of equal value to provide a sum signal, R-C circuit differentiating means for differentiating the sum signal and adding the sum signal and the differential to provide an output signal, the output signal of the first of the two cascaded assemblies being supplied to the input of the second of the two cascaded assemblies, said summing means summing the outputs of the two cascaded groups and supplying the output thereof to said nonlinear amplifier means, said nonlinear amplifier means providing the output signal thereof to said output means.

17. Apparatus according to claim 16, wherein said output means includes means for effecting the setting to zero of the output signal of the nonlinear amplifier means and for calibration of the output signal.

18. Apparatus according to claim 17, further comprising means for algebraically adding at least one additional signal to the quantified function output signal, said at least one additional signal being one of a signal representative of the value of the function Z, and an external signal generated by an external device.

19. Apparatus according to claim 5, wherein said at least one additional signal is a brief pulse type signal at each variation of the quantification.

20. Apparatus according to claim 5, wherein said at least one additional signal is a signal representative of the value of the function Z.

21. Apparatus according to claim 5, wherein said at least one additional signal is an external signal.

22. Apparatus according to claim 8, wherein said at least one additional signal is a brief pulse type signal at each variation of the quantification.

23. Apparatus according to claim 8, wherein said at least one additional signal is a signal representative of the value of the function Z.

24. Apparatus according to claim 8, wherein said at least one additional signal is an external signal.

25. Apparatus according to claim 11, wherein said at least one additional signal is a brief pulse type signal at each variation of the quantification.

26. Apparatus according to claim 11, wherein said at least one additional signal is a signal representative of the value of the function Z.

27. Apparatus according to claim 11, wherein said at least one additional signal is an external signal.

* * * * *